United States Patent
Enoki et al.

(10) Patent No.: US 9,705,837 B2
(45) Date of Patent: Jul. 11, 2017

(54) METHOD, COMPUTER PROGRAM AND COMPUTER FOR DETECTING TRENDS IN SOCIAL MEDIA

(71) Applicant: INTERNATIONAL BUSINESS MACHINES CORPORATION, Armonk, NY (US)

(72) Inventors: Miki Enoki, Kanagawa-ken (JP); Yohei Ikawa, Kanagawa-ken (JP); Tetsuya Nasukawa, Tokyo (JP); Raymond Harry Rudy, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 379 days.

(21) Appl. No.: 14/363,323

(22) PCT Filed: Nov. 16, 2012

(86) PCT No.: PCT/JP2012/079751
§ 371 (c)(1),
(2) Date: Oct. 9, 2014

(87) PCT Pub. No.: WO2013/094352
PCT Pub. Date: Jun. 27, 2013

(65) Prior Publication Data
US 2015/0067078 A1    Mar. 5, 2015

(30) Foreign Application Priority Data
Dec. 19, 2011 (JP) ................................ 2011-276973

(51) Int. Cl.
*G06F 15/16* (2006.01)
*H04L 12/58* (2006.01)
(Continued)

(52) U.S. Cl.
CPC ........ *H04L 51/32* (2013.01); *G06F 17/30702* (2013.01); *G06F 17/30861* (2013.01); *G06Q 50/01* (2013.01); *H04L 51/34* (2013.01)

(58) Field of Classification Search
CPC ............... H04L 51/34; G06F 17/30702; G06F 17/30861
See application file for complete search history.

(56) References Cited

U.S. PATENT DOCUMENTS 8,332,512 B1 * 12/2012 Wu .................... G06Q 30/0254
  705/319
2011/0307464 A1 * 12/2011 Ghosh ............... G06F 17/30899
  707/706

(Continued)

FOREIGN PATENT DOCUMENTS

GB      2507667 A    5/2014
JP  2004319689 A   11/2004
(Continued)

OTHER PUBLICATIONS

Peng et al. (NPL, "Retweet modeling using conditional random fields", ICDMW Conference, Dec. 2011).*

(Continued)

*Primary Examiner* — Padma Mundur
(74) *Attorney, Agent, or Firm* — Kurt P Goudy (57) ABSTRACT

The present invention provides a method for selecting an identified message group from among the plurality of messages sent by a plurality of users of social media. For the messages sent by users other than the original user that quote the message sent by the original message user, the method provides: performing a primary evaluation of the potential for being further resent; identifying a single user who has sent a message for which the primary evaluation result was higher than a predetermined first threshold; identifying a message group similar to a resent messages group, based on (Continued)

a resent messages group that quotes the message send by the single user; performing a secondary evaluation for the potential that the similar message group will be further resent; and selecting a message group for which the secondary evaluation result was higher than a predetermined second threshold.

10 Claims, 8 Drawing Sheets

(51) Int. Cl.
*G06Q 50/00* (2012.01)
*G06F 17/30* (2006.01)

(56) References Cited

U.S. PATENT DOCUMENTS

| | | | |
|---|---|---|---|
| 2012/0042020 A1 | 2/2012 | Kolari et al. | |
| 2012/0131139 A1* | 5/2012 | Siripurapu | H04L 65/60 709/217 |
| 2012/0158630 A1* | 6/2012 | Zaman | G06Q 30/02 706/21 |
| 2013/0041860 A1* | 2/2013 | Lawrence | G06Q 50/01 706/46 |

FOREIGN PATENT DOCUMENTS

| | | |
|---|---|---|
| JP | 2008-165598 A | 7/2008 |
| WO | 03021478 A2 | 3/2003 |

OTHER PUBLICATIONS

Bakshy et al. (NPL, "Identifying 'Influencers' on Twitter," Conference Proceedings WSDM, Feb. 2011).*

J. Klienberg, "Bursty and Hierarchical Structure in Streams", Proceeding of the 8th ACM SIGKDD International Conference on Knowledge Discovery and Data Mining, (2002).

Tauhid R. Zaman et al.: 'Predicting Information Spreading in Twitter', Dec 31, 2010, p. 1-4 Retrieved from the Internet <:http://research.microsoft. com/pubs/141866/.

Kiyotaka Goto et al.: "'A Proposal of a Method for Searching "Curators" Based on Activities on Social Medias'" FIT2010 DAI 9 KAI Forum on in Teck Koen Robunshu, V. 4, sad.

Yusuke Ota et al., "Visualization of Overlapping Pathways fo Retweet in Twitter". Forum Info Tech 2011. p. 73-76.

Lee et al., "BursT: A Dynamic Term Weighting Scheme for Mining Microblogging Messages", Advances in Neural Networks—ISNN 2011, pp. 548-557.

Yamaguchi et al., "TURank: Twitter User Ranking Based on User-Tweet Graph Analysis", Web Information Systems Engineering, WISE 2010, pp. 240-253.

Tang et al., "Social Influence Analysis in Large-Scale Networks", Proceedings of the 15th ACM SIGKDD International Conference on Knowledge Discovery and Data Mining, 2009, pp. 807-816.

Gao et al., "Detecting and Characterizing Social Spam Campaigns", Proceedings of the 10th ACM SIGCOMM Conference on Internet Measurement, 2010, pp. 35-47.

* cited by examiner

METHOD, COMPUTER PROGRAM AND COMPUTER FOR DETECTING TRENDS IN SOCIAL MEDIA

CROSS-REFERENCE TO RELATED APPLICATIONS

This application claims priority under 35 U.S.C. 371 from PCT Application, PCT/JP2012/079751, filed on Nov. 16, 2012, which claims priority from the Japanese Patent Application No. 2011-276973, filed on Dec. 19, 2011. The entire contents of both applications are incorporated herein by reference.

BACKGROUND OF THE INVENTION

Field of the Invention

This invention relates to information processing technology, and more specifically it relates to technology for more quickly and more accurately detecting burst information (information disseminated on a scale differing from normal) in social media.

Description of the Related Art

There exists a phenomenon in which, when a natural disaster or important social issue arises, information on social media is disseminated with extreme quickness and on a vast scale, and that phenomenon has at times been called a "burst" phenomenon. Within such burst information there is included information that differs from the facts (such as misinformation, rumors), and depending on the situation this information can be a threat to enterprise activities. Accordingly, there is sought technology that can quickly and accurately detect a "burst" phenomenon.

In response to this need, various former technologies have been offered. As an example, in Japanese Patent 2008-165598A, for the problem stated "To provide technology capable of taking rumor information from the information disclosed on a network, simultaneously extracting information related to such, and simultaneously presenting it to the user," there has been offered a technology that, "Comprises a data collection means for receiving data disclosed by a server device on a network and for storing the data as various collection data in a collected data memory means; a rumor information judgment means for extracting a character string included in the collected data and for obtaining a judgment result, based on the character string, whether or not the collected data is rumor information; a related information data extraction means for extracting, from a server device on a network or from a pre-accumulated related information database, rumor information data judged to be rumor information and related information data being at least the author of the rumor information data, or the content of the rumor information data, or the name or network address of the server device storing the data, or file information for the rumor information data; and, an output means for simultaneously outputting the rumor information data and the related information data." Additionally, in J. Kleinberg: Bursty and Hierarchical Structure in Streams, Proceeding of the 8th ACM SIGKDD International Conference on Knowledge Discovery and Data Mining, (2002), there is offered technology for detecting whether or not information is burst information by evaluating the increase extent of keywords.

SUMMARY OF THE INVENTION

One aspect of the present invention provides a computer-implemented method for selecting an identified message group, from among a plurality of messages sent by a plurality of users through social media, wherein the plurality of messages include messages sent by users other than an original user, and the messages quote the message sent by the original user. The method includes the steps of: performing a primary evaluation of the potential for a message sent by a user other than an original user that quotes the message sent by the original user to be resent for a message sent by a user other than an original user that quotes the message sent by the original user; identifying a single user who has sent a message for which the primary evaluation result was higher than a predetermined first threshold; identifying a message group similar to a resent messages group, wherein the message group is based on a resent messages group that quotes the message send sent by the single user; performing a secondary evaluation for the potential that the similar message group to be further resent; and selecting a message group for which the secondary evaluation result was higher than a predetermined second threshold.

Another aspect of the present invention provides a system for selecting an identified message group from a plurality of messages sent by a plurality of users through social media, wherein the plurality of messages comprise of messages sent by users other than an original user, and the messages quote the message sent by the original user. The system includes a memory that stores the plurality of messages, a processor device communicatively couple to the memory, and a user terminal module communicatively coupled to the memory and the processor, where the user terminal is configures to perform the steps of the method. The method includes: performing a primary evaluation of the potential for a message sent by a user other than an original user that quotes the message sent by the original user to be resent for a message sent by a user other than an original user that quotes the message sent by the original user; identifying a single user who has sent a message for which the primary evaluation result was higher than a predetermined first threshold; identifying a message group similar to a resent messages group, wherein the message group is based on a resent messages group that quotes the message send sent by the single user; performing a secondary evaluation for the potential that the similar message group to be further resent; and selecting a message group for which the secondary evaluation result was higher than a predetermined second threshold.

A computer readable non-transitory article of manufacture tangibly embodying computer readable instructions which, when executed, cause a computer to carry out the steps of a method as described above.

DETAILED DESCRIPTION OF THE PREFERRED EMBODIMENTS

Specifically, through the research of the inventors this invention has been created after obtaining the following knowledge: 1. Dissemination potential differs by the degree of influence of the sending user (information sent by a highly influential user is more likely to be re-sent). 2. Dissemination potential differs by the frequency at which the user resends (the importance at resending differs for a user who often resends and a user who seldom resends). 3. The re-dissemination potential differs by the uniqueness of the information (the potential for dissemination of the information is high when the content of the resent information differs from normal).

The following section describes in detail an optimal mode for executing this invention, based on the drawings, but the following embodiment does not limit the invention according to the Scope of Claims, and the entire combination of characteristics described within the embodiment are not essential to solving means of the invention. This invention can be executed by many differing modes, and there is no reason that it should be interpreted with limitation to the content recorded for the embodiment. Furthermore, it is appropriate to caution that the entire combination of characteristics described in the embodiment are not essential to solving the invention. Identical symbols are applied to the identical elements throughout the entire description of the embodiment (when not specified otherwise).

Figure 1:
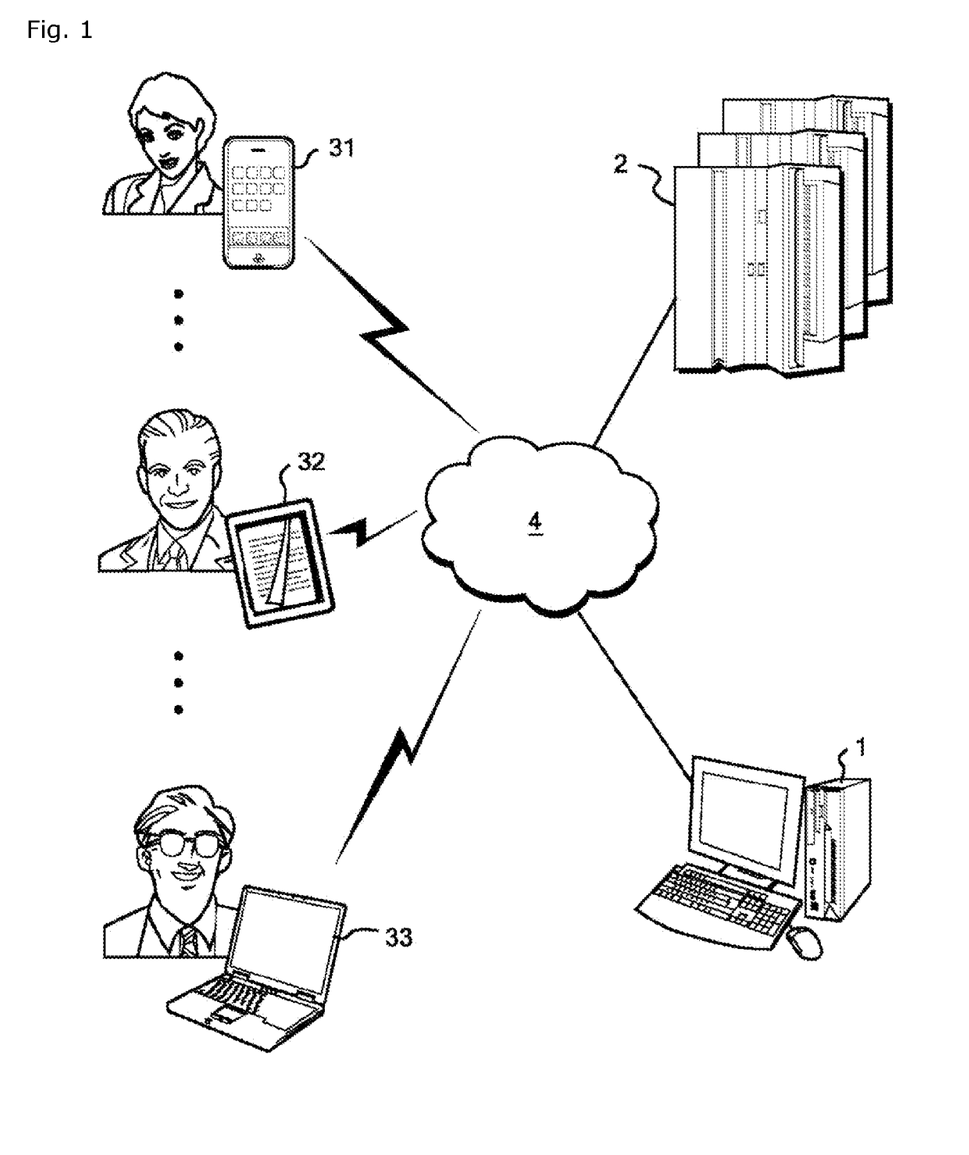
FIG. 1 is an overview drawing that explains the system of a microblog.

FIG. 1 is an overview drawing that explains the system of a microblog. This system comprises microblog server 2 and user terminals, and these are reciprocally connected for communications through Internet 4. The user terminals can be any mode of computer providing a communications function. For example, smartphone 31, tablet 32 and personal computer (notebook type) 33 are shown in the drawing, but in addition, though not shown, there can be utilized such as a personal data assistant (PDA, mobile information device), vehicle mounted computer or a netbook.

Figure 2:
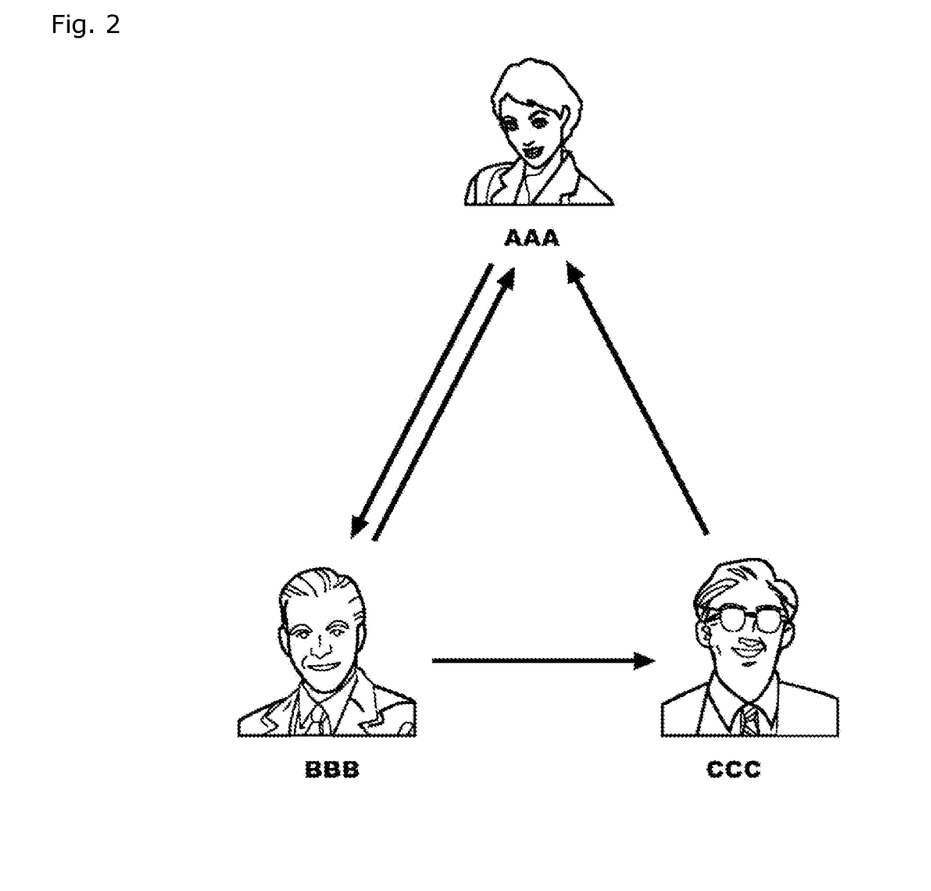
FIG. 2 is an overview drawing that explains the relationship of followers and followed for a microblog.

FIG. 2 is an overview drawing that explains the relationship of followers and followed for a microblog. A user of the microblog can register in advance other users who share the same hobbies or interests, and the user can automatically receive messages sent by those other users. This registration process is called "to follow," and the related relationship can be of two kinds: wherein the both involved users follow each other, and wherein only one of the users unilaterally follows the other user. For example, the arrows in FIG. 2 show that user AAA and user BBB are reciprocally following each other, while user BBB is unilaterally following CCC, and user CCC is unilaterally following user AAA.

Figure 3:
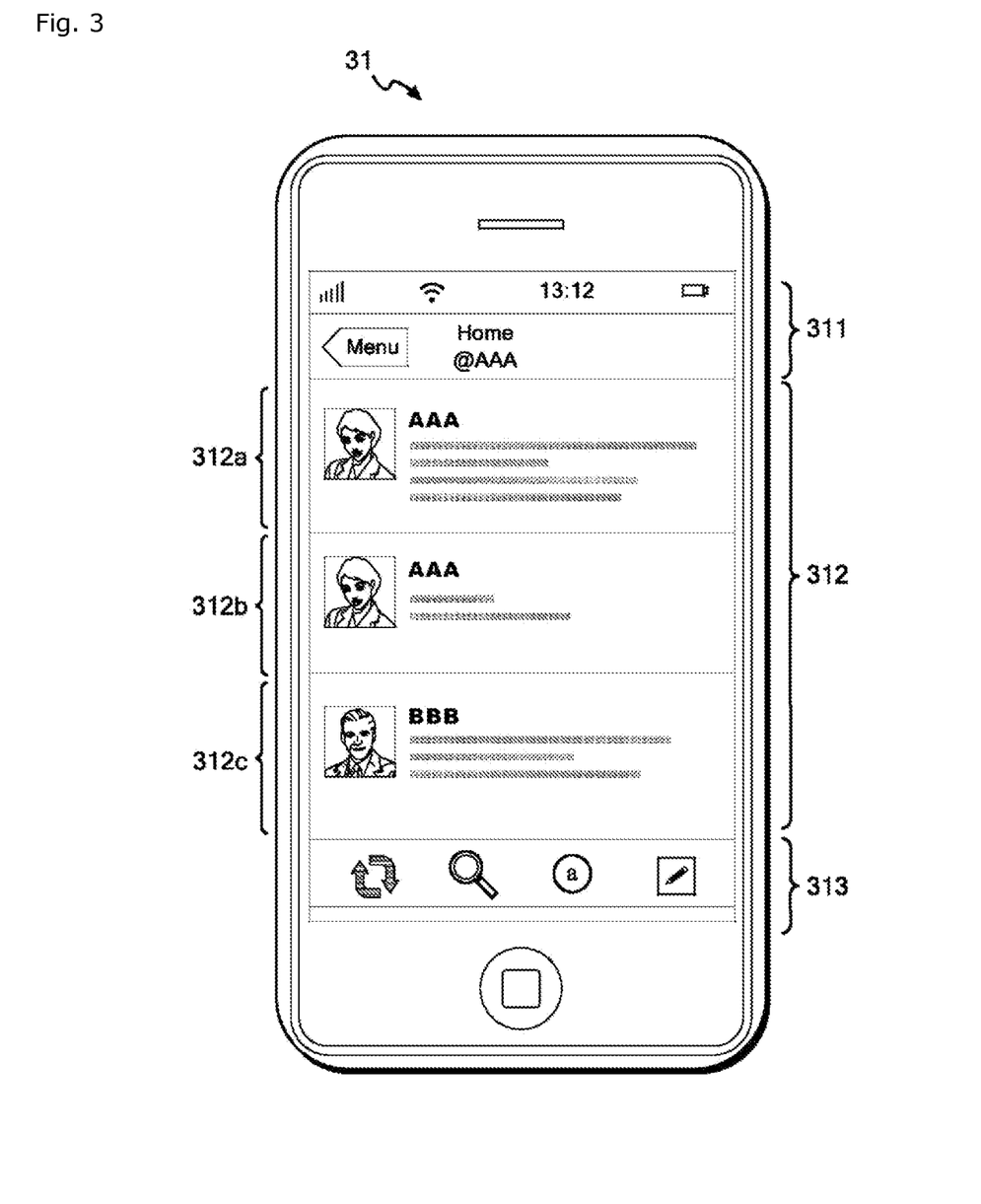
FIG. 3 is an explanatory drawing of a smart phone functioning as a user terminal, and of the related screen display.

FIG. 3 is an explanatory drawing of smart phone 31 functioning as a user terminal, and of the related screen display. The screen of a microblog application is displayed on the touch screen of smartphone 31, and the application screen is divided into, in order from the top, home component 311, timeline component 312, and operating component 313. Within home component 311 there is displayed a menu button and an indicator that timeline component 312 is the timeline of user AAA. Within timeline component 312 there is displayed, in order from the top, message components 312*a* and 312*b* from user AAA, as well as message component 312*c* from user BBB. These message components 312*a*~312*c* are displayed along a time series. Specifically, message component 312*a* at the highest position corresponds to the newest message.

Figure 4:
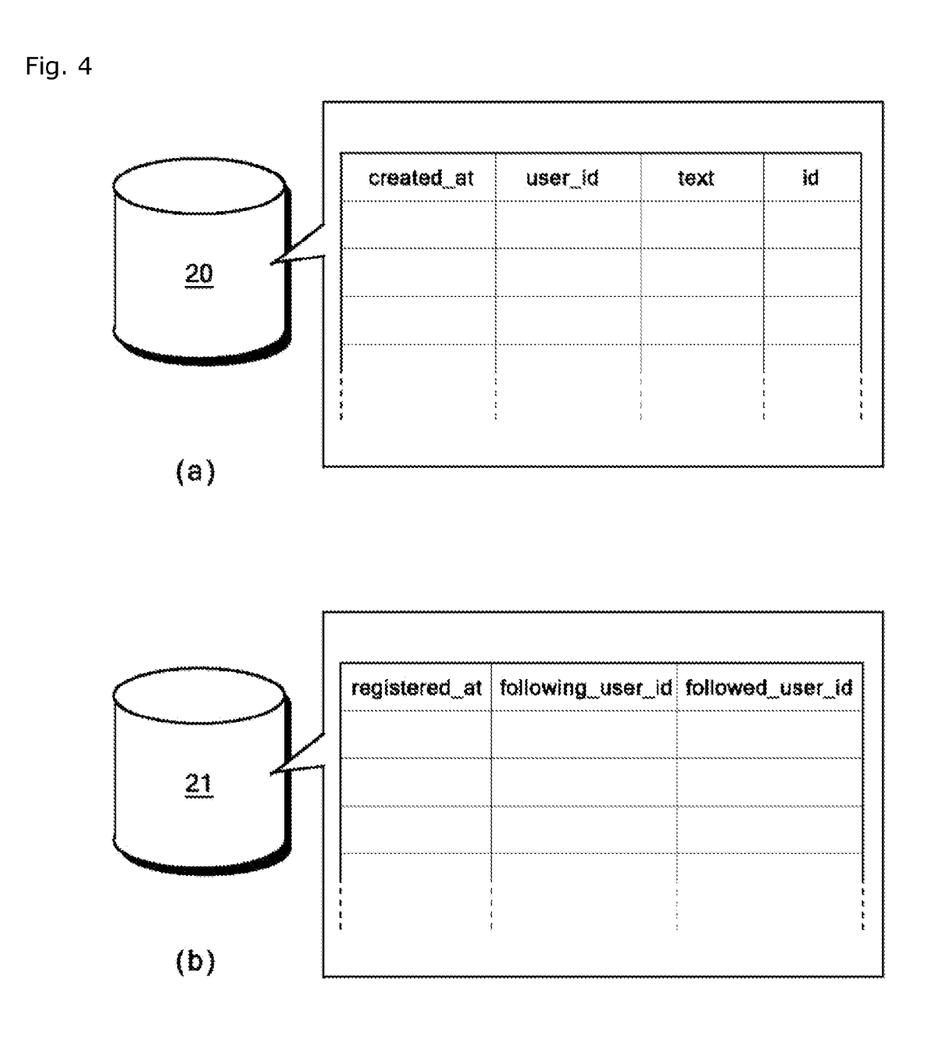
FIG. 4 is an explanatory drawing of the data structure for data stored in the hard disk device of a microblog server.

FIG. 4 is an explanatory drawing of the data structure for data stored in hard disk devices 20 and 21 of microblog server 2. Within the message table (FIG. 4 (*a*)) stored in hard disk device 20, there is provided a send time (created_at) that shows the date and time at which each message was sent, a message ID (id) that identifies each message, a user ID (user_id) that identifies the user who sent the message, and the text (text), which is the content of the message. Furthermore, it is possible to set a character count limit for the text (such as 140 characters or less). Concurrently, within user relationship table (FIG. 4 (*b*)) stored in hard disk device 21, there is provided a registration time (registered_at) that shows the date and time at which a following relationship was registered, a follow origin user ID (following_user_id) that identifies the user being the origin of the following, and a follow destination user ID (followed_user_id) that identifies the user being the destination of the following.

Figure 5:
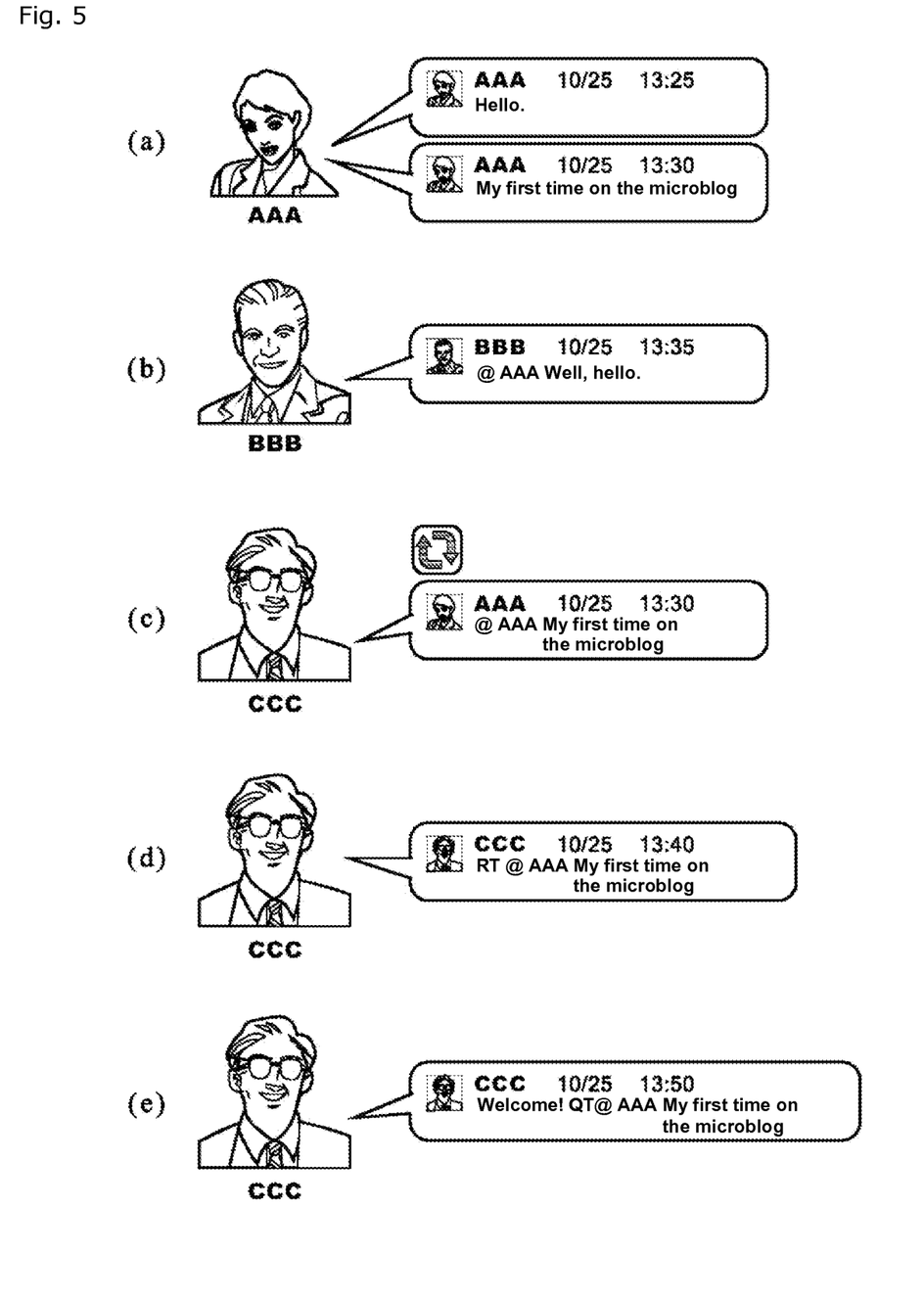
FIG. 5 is an explanatory drawing of the types of messages sent.

FIG. 5 is an explanatory drawing of the types of messages sent. FIG. 5 (*a*) describes a normal message. Here, user AAA has sent messages to her own timeline, and these messages are displayed not only in the timeline of user AAA but also in the timelines of those following user AAA (in the example of FIG. 2, user BBB and user CCC). FIG. 5 (*b*) describes a reply message. A reply message is a response to a specific message, and it is displayed in the respondent's timeline as well as in the timelines of those following the respondent. Here, user BBB sends the reply message "Well, hello." as a response to the message of user AAA, and this reply message is displayed in the timeline of user BBB as well as the timelines of users following user BBB (in the example of FIG. 2, user AAA).

FIGS. 5 (*c*) and 5 (*d*) both describe a type of copy message, and they show forms of resending the user AAA origin message "My first time on the microblog," which was displayed in the timeline of user CCC, as a copy message. In both cases, the copy message is displayed in the timelines of users who follow user CCC (in the example of FIG. 2, user BBB), but with the mode shown in FIG. 5 (*c*) it is displayed in timelines of users who follow user CCC with the name of original poster user AAA, and with the second mode shown in FIG. 5 (*d*) it is displayed with the name of the forwarding poster user CCC. FIG. 5 (*e*) describes a quote message. This shows a form of resending the user AAA origin message "My first time on the microblog," which was displayed in the timeline of user CCC, as a message that quotes the original and also includes the user CCC new comment "Welcome!" The quoted message is displayed in the timelines of users who follow user CCC.

Figure 6:
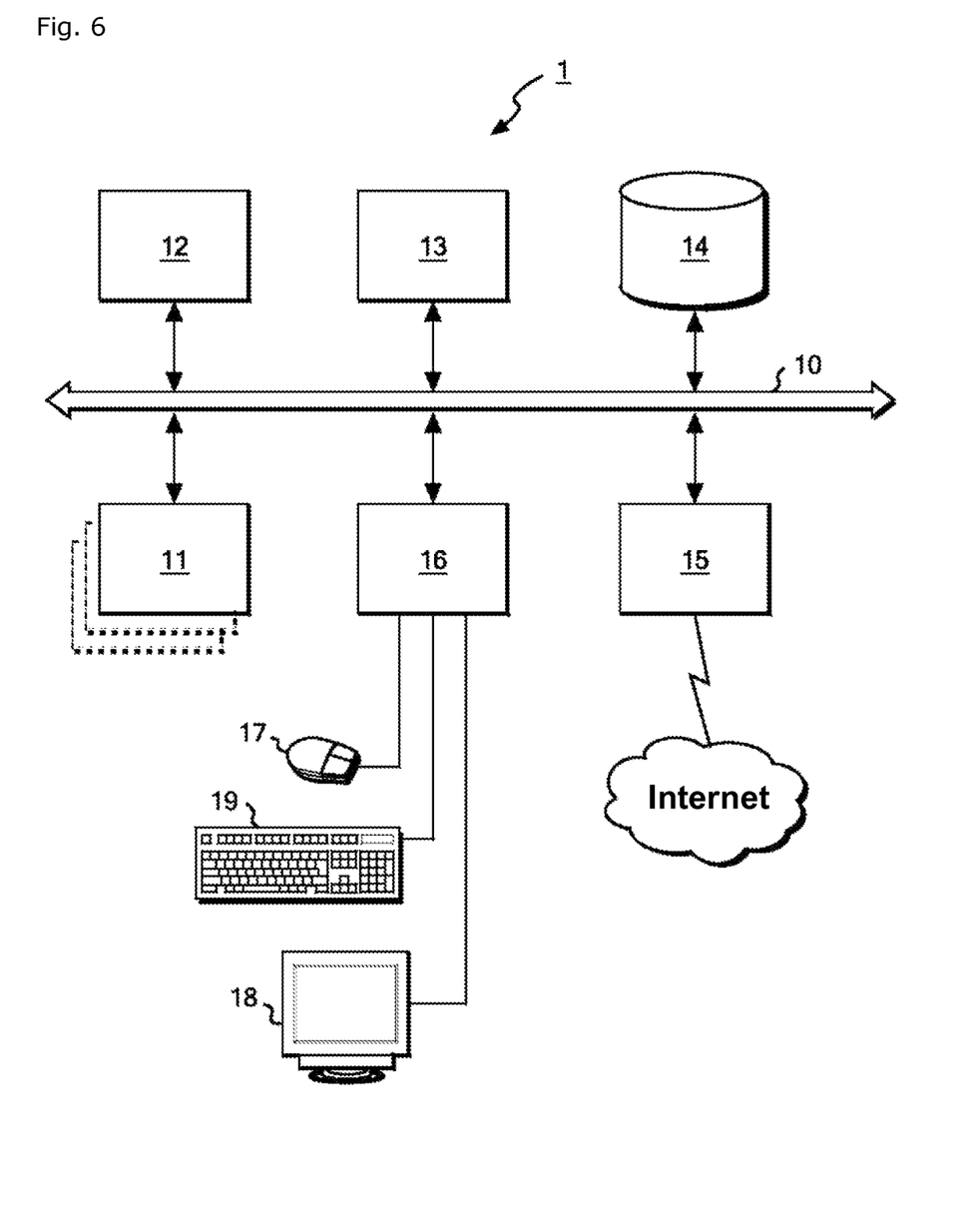
FIG. 6 is a block diagram that explains the hardware structure of a computer.

FIG. 6 is a block diagram that explains the hardware structure of a computer. The hardware structure of computer 1 comprises (low speed or high speed) bus 10, CPU (central processing unit) 11 connected to bus 10, RAM (random access memory, a memory device) 12, ROM (read only memory, a memory device) 13, HDD (hard disk drive, a memory device) 14, communications interface 15, and input-output interface 16. There is further provided mouse 17, flat panel display (display device) 18, and keyboard 19 connected to input-output interface 16. Computer 1 is described as that which has adopted a general personal computer architecture, but components such as CPU 11 and HDD 14 can be multiplexed when higher data processing performance and availability. It is also possible to utilize various other types of computer systems in place of a desktop computer.

The software structure of computer 1 comprises an operating system (OS) offering foundational functions, application software that utilize the functions of the OS, and driver software for the input-output devices. Each of these pieces of software are loaded into RAM 12 along with various data and are executed by such as CPU 11. Computer 1 as a unit executes the processing shown in FIG. 7.

Figure 7:
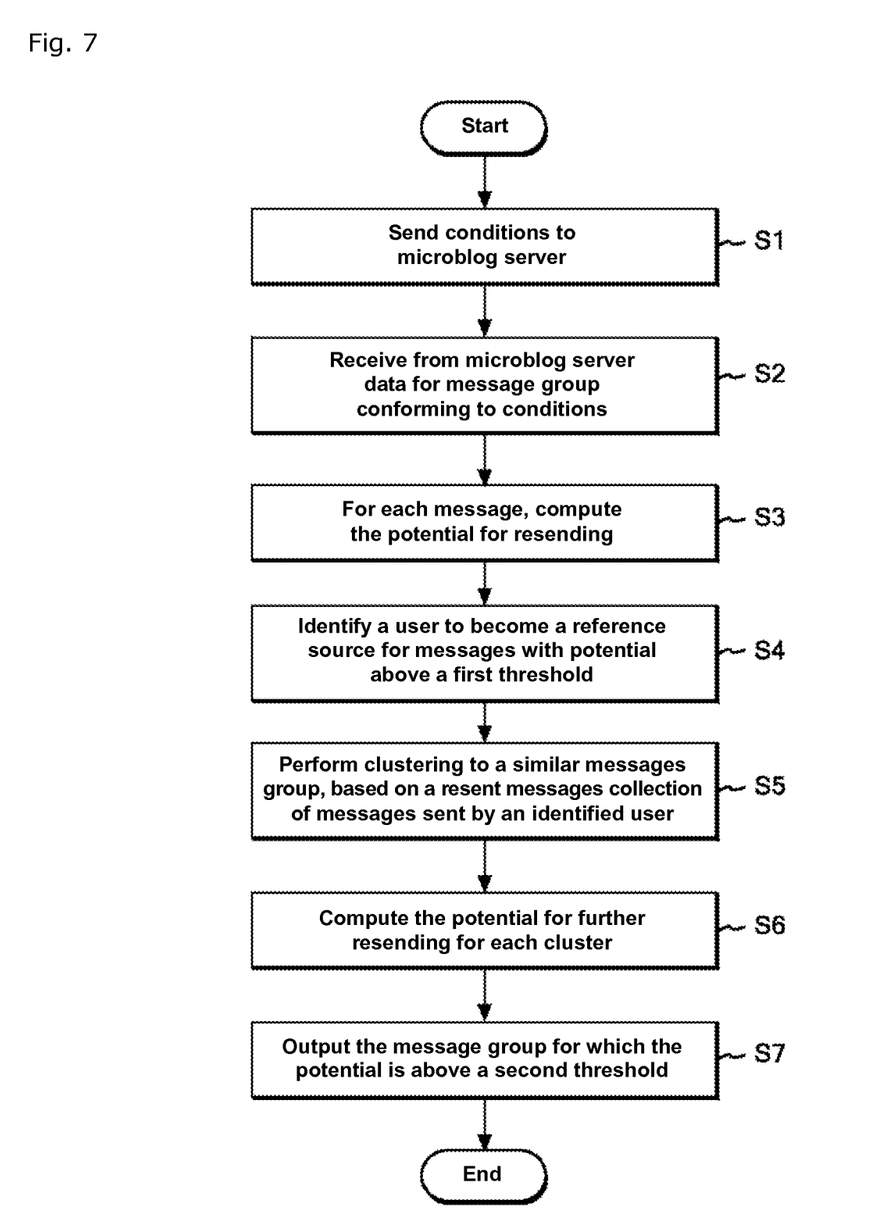
FIG. 7 is a flow chart that explains the processing executed by the computer.

FIG. 7 is a flow chart that explains the processing executed by the computer. First, a condition is sent from computer 1 to microblog server 2 (S1). This can be a condition that specifies the time period during which the message was sent, one that specifies that a particular keyword be included within the message, one that specifies only resent messages, or one that combines these parameters. Next, computer 1 receives from microblog server 2 data for a group of messages that conform to the above stated condition (S2). At this time, it is acceptable to concurrently receive data about the users related to these messages (FIG. 4 (*b*)) along with the data for the message group conforming to the condition (FIG. 4 (*a*)).

Figure 8:
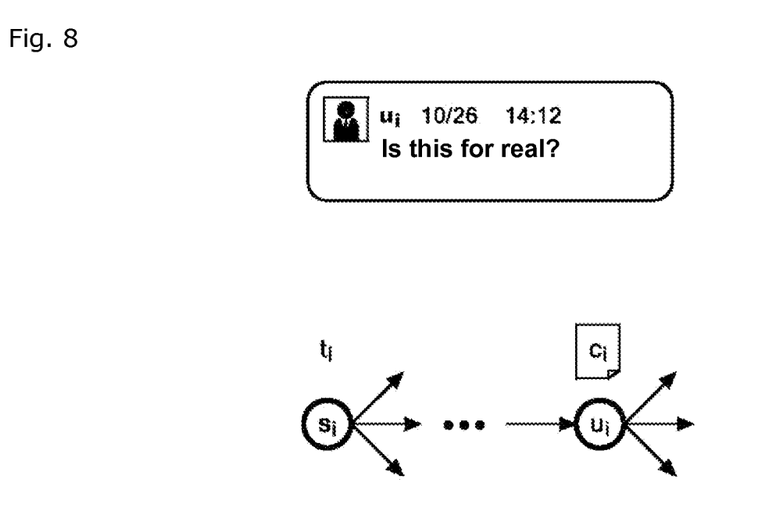
FIG. 8 is an explanatory drawing of formulation for computation of potential for resending.

Next, for each message, the process computes the potential for it to be resent (S3). FIG. 8 is an explanatory drawing of formulation for computation of potential for resending. Here, the four sets sending time ti, sending user ui, information referenced origin user si, and content ci are used to define message mi as mi=(ti, ui, si, ci) (i=1, 2 . . . ). A message that will be resent signifies the previously described copy message (FIGS. 5 (*c*) and 5 (*d*)) and the quote message (FIG. 5 (*e*)). The first mode copy message shown in FIG. 5 (*c*) and the quote message both embody a public function prepared on the microblog server 2 side, so by setting the message ID to reflect that, such as including within the message ID (see FIG. 4 (*a*)) the user ID for information referenced origin user si, there is ability to indicate a first mode copy message or quote message. Comparatively, the second mode copy message shown in FIG. 5 (*d*) does not embody a public function prepared on the microblog server 2 side, so to indicate this there is used a unique string to be displayed in the content of the second mode copy message, such as "RT@", which enables identifying that it is a second mode copy message as well as the information referenced origin user si.

Figure 9:
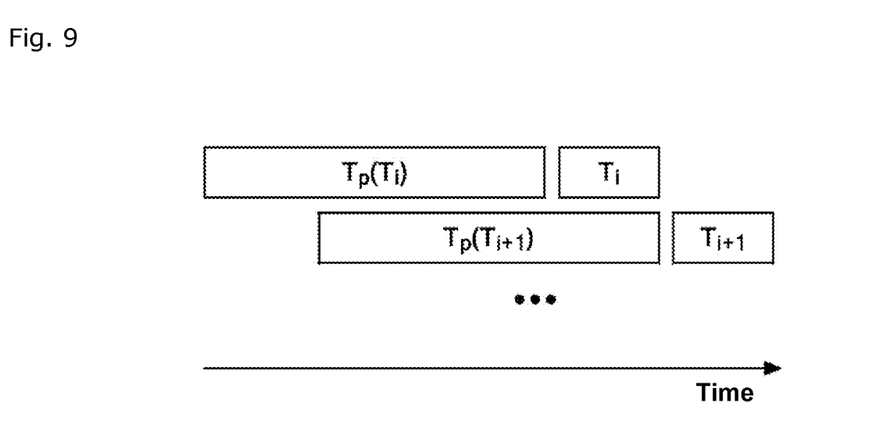
FIG. 9 is an explanatory drawing of time period Tp(T) in the past of time period T.

FIG. 9 is an explanatory drawing of time period Tp(T) in the past of time period T for evaluating dissemination potential during time period T. Here, a digraph of the following relationship on the microblog during time period T is made G(T)=(V(T), E(T)). V(T) is the collection of users during time period T, and E(T) is {e(u, s)|user u follows user s within time period T}.

Next, there is defined dissemination potential burst[m](mi) for message mi. Here, the information sent by user si is presumed resent as message mi by user ui during time period T, and dissemination potential burst[m](mi) is defined by the following equation.

$$burst_m(m_i) = \frac{centrality(u_i, T)}{1 + \alpha \times ref(u_i \to s_i; T_p(T)) \times \beta \times sim(C(u_i, T_p(T)), c_i)} \quad \text{Equation 1}$$

$$m_i = (t_i, u_i, s_i, c_i) \ t_i \in T$$

Here, centrality(u, T) shows the centrality within time period T for user u. Specifically, centrality(u, T) can be computed by using each type of centrality (closeness centrality, etc.). A natural logarithm for the degree centrality (number of other users who follow each user) is adopted, and centrality(u, T) takes log [e](#followers). In addition, ref(u–>s, T) shows the extent at which user u has referenced the information sent by user s during time period T. Specifically, ref(u–>s, T) signifies whether or not user u has referenced and resent user s during time period T, taking [0,1]. The value is 1 if user u has referenced and resent user s during time period T, and 0 if not. This enables setting a discretionary function so as to increase according to the reference degree, but the numerical range does not need to be from 0 to 1. sim(C, c) shows the degree of similarity between content collection C (upper case) and content c (lower case). Specifically, sim(C, c) can be computed by using cosine similarity in a vector space model, taking [0,1]. In short, it expresses the text as multidimensional vectors of words (nouns, etc.) in a vector space model. The result is the enabling of the similarity of two documents to be computed as the similarity of vectors. The cosine similarity is the cosine of angle θ formed by the two document vectors (cos θ). The cosine similarity takes 1 when the two vectors completely match. This enables setting a discretionary function so as to increase according to the similarity degree, but the numerical range does not need to be from 0 to 1. Additionally, C(u, T) shows the collection of blog content that user u has sent during time period T. Furthermore, a is a constant that sets the influence of ref, and in this case, α=5. β is a constant that sets the influence of sim, and in this case, β=5.

From dissemination degree burst[m](mi) for message mi sent during time period T, the dissemination degree burst[s] (s, T) for information sent by user s in time period T can be sought with the following equation.

$$burst_s(s, T) = \sum_{i, s.t. \ t_i \in T, s_i, s} burst_s(s, T) \quad \text{Equation 2}$$

$$m_i = (t_i, u_i, s_i, c_i)$$

Next, there is identified the user becoming the reference origin for a message with dissemination potential at a first abnormal threshold (S4). Specifically, from the burst[s](s, Ti) series obtained for time period Ti(i=1, 2 . . . ), there is performed burst detection using the existing method disclosed in J. Kleinberg: Bursty and Hierarchical Structure in Streams, Proceeding of the 8th ACM SIGKDD International Conference on Knowledge Discovery and Data Mining, (2002), thereby identifying user s sending the burst information. In other words, the burst degree is judged based on a model that has an activity degree for the hidden mode, and, for the given series, shifts to a higher activity degree if the frequency becomes higher.

Next, based on the message collection of resent messages originally sent by the identified user, there is clustering to a similar message group (S5). Specifically, there is detecting of whether user S[b] sent burst information at time period Tb. For the information sent by user s, relative to time period T resent message collection M(s, T)={m[i]|t[i] ∈ T, s[i]=s}, there is created cluster M[j] ⊆ M(s, T) (j=1, 2 . . . ) for each identical content. The following two methods can be applied during this process. First is the method using a character string match. This uses character string matching to compare the content sent by user s[b] ("Mouthwash seems to be effective for radiation exposure." in FIG. 8), which is included in the content of messages m ∈ M(s, T), and the matched messages are placed in the same cluster. The other method is by document clustering. This clusters a content collection included in M(s[b], T[b]) using an existing document clustering method (the k-means method, for example).

Next, for each cluster there is computed the potential of being further resent (S6). Specifically, dissemination degree burst[M](M[j]) for the content of cluster M[j] is sought with the following equation.

$$burst_M(M_j) = \sum_{i \, s.t. \, m_i \in M_j} burst_m(m_i) \qquad \text{Equation 3}$$

The potential outputs a message group above a second threshold (S7). Specifically, it detects a burst if burst[M](M[j]) is at or above a threshold (second threshold).

The steps for performing the primary evaluation and the secondary evaluation, the potential for further resending can be computed as an increasing function of the influence of another user. More specifically, the degree of influence of the other user can be computed as an increasing function of the quantity of users who follow the other user. Moreover, at the steps for performing the primary evaluation and the secondary evaluation, the potential for further resending can be computed as a decreasing function of the extent to which the other user has in the past resent messages that quoted the message of the first user. More specifically, the extent of having resent can be computed as the number of times the other user has within a fixed period in the past resent messages that quoted the message of the first user. Further, at the steps for performing the primary evaluation and the secondary evaluation, the potential for further resending can be computed as a decreasing function of the similarity of the content of a message resent by the other user and the content of a message resent further in the past by the other user. More specifically, the similarity can be computed by matching a text string to a message resent by the other user and to a message resent further in the past by the other user.

Furthermore, the messages can be messages sampled from those posted on social media under prescribed conditions. Moreover, the messages can be messages sampled from those posted within a prescribed time period on social media under conditions that include a prescribed keyword. Additionally, the social media can be a microblog.

In addition, there can be structuring such that the computer that posts to social media is connected through a network to a computer that selects an identified message group, and further comprising a step for the selecting computer receiving messages sent from the posting computers in response to a prescribed condition request from the selecting computer. There can also be further comprising of a step for storing the received messages in a memory means of the selecting computer.

This invention is able to take the form of an embodiment which is entirely hardware, or of an embodiment that in entirely software, or of an embodiment that includes elements of both hardware and software. In a preferable embodiment, while not being limited to the following, this invention is executed by software that includes firmware, permanent software, microcode or syntax parsing pico-code.

Furthermore, this invention can adopt the mode of a computer, or discretionary command execution system, or a computer program or computer readable medium that provides program code for use related to such. In fulfilling the purpose of this invention, the computer readable medium can be a discretionary device capable of housing, storing, communicating, or propagating a program for a discretionary command execution system, apparatus or device or for related use. Specifically, the previously mentioned syntax parsing control module structures this discretionary command execution system or "computer."

The medium can be an electronic, magnetic, optical, electromagnetic, infrared or semiconductor system (or apparatus or device) or propagation medium. As examples of a computer readable medium, there can be offered a semiconductor or solid state memory, magnetic tape, mountable-removable computer diskette, random access memory (RAM), read only memory (ROM), rigid electromagnetic disk, or optical disc. As current examples of an optical disc, there can be offered a compact disc read-only memory (CD-ROM), a compact disc readable-writable memory (CD-R/W), and a DVD.

For a data processing system suitable for storing, executing or both storing and executing program code, there can be offered at least one processor directly or indirectly linked to a memory element through a system bus. For this memory element, there can be offered a local memory or bulk memory device used during the process of actual execution of the program code, or, in order to reduce the number of times there must be reading form the bulk memory device during execution, a cache memory that provides temporary storage for at least a portion of the program code.

An input-output device or I/O device (such as a keyboard, display, and pointing device, although there is no limitation to such) can be linked to the system directly or through an intermediary I/O controller.

Furthermore, a network adapter can be linked to the system, and the data processing system can be arranged to connect to another data processing system, or a remote printer or a memory device, through the intermediation of a private or public network. A portion of currently obtainable network adapters are a modem, cable modem, and Ethernet (R) card.

The invention claimed is:

1. A computer-implemented method for selecting an identified message group from a plurality of messages sent by a plurality of users through social media, wherein the plurality of messages include messages sent by users other than an original user, and the messages quote the message sent by the original user, the method comprising the steps of:

performing a primary evaluation of the potential for a message sent by a user other than the original user that quotes the message sent by the original user to be resent;

identifying original user who has sent the message for which the primary evaluation result was higher than a predetermined first threshold;

identifying a message group similar to a resent messages group, wherein the message group is based on the resent messages group that quotes the message sent by the original user;

performing a secondary evaluation for the potential that the similar message group to be resent; and selecting the message group for which the secondary evaluation result was higher than a predetermined second threshold, wherein performing the primary evaluation and the secondary evaluation is based on a decreasing function of the extent to which the user other than the original user has in the past, resent messages that quoted the message of the original user, wherein the influence of the user is based on an increasing function of a quantity of other users who follow the user other than the original user, wherein the extent of past resent messages is based on the number of times the user other than the original user has in a fixed period in the past, resent messages that quoted the message of the original user, wherein performing the primary evaluation and the secondary evaluation is based on a decreasing function of the similarity of the content of a message resent by the user and the content of a message resent further in the past by the user other than the original user.

2. The method according to claim 1, wherein performing the primary evaluation and the secondary evaluation is based on an increasing function of an influence of the user other than an original user.

3. The method according to claim 1, wherein the messages are messages sampled from those posted on social media under prescribed conditions.

4. The method according to claim 1, wherein the plurality of messages are messages sampled from those posted in a prescribed time period on social media under conditions that include a prescribed keyword.

5. The method according to claim 4, further comprising:
connecting a posting computer that posts to social media through a network to a selecting computer that selects the identified message group; and
selecting computer receiving messages sent from the posting computer in response to a prescribed condition request from the selecting computer.

6. The method according to claim 5, further comprising storing the received messages in a memory of the selecting computer.

7. The method according to claim 1, wherein the social media is a microblog.

8. A computer readable non-transitory article of manufacture tangibly embodying computer readable instructions which, when executed, cause a computer to carry out the steps of a method comprising:
performing a primary evaluation of the potential for a message sent by a user other than an original user that quotes the message sent by the original user to be resent;
identifying original user who has sent the message for which the primary evaluation result was higher than a predetermined first threshold;
identifying a message group similar to a resent messages group, wherein the message group is based on the resent messages group that quotes the message sent by the original user;
performing a secondary evaluation for the potential that the similar message group to be resent; and
selecting the message group for which the secondary evaluation result was higher than a predetermined second threshold,
wherein performing the primary evaluation and the secondary evaluation is based on a decreasing function of the extent to which the user other than the original user has in the past, resent messages that quoted the message of the original user, wherein the influence of the user is based on an increasing function of a quantity of other users who follow the user other than the original user, wherein the extent of past resent messages is based on the number of times the user other than the original user has in a fixed period in the past, resent messages that quoted the message of the original user, wherein performing the primary evaluation and the secondary evaluation is based on a decreasing function of the similarity of the content of a message resent by the user and the content of a message resent further in the past by the user other than the original user.

9. A system for selecting an identified message group from a plurality of messages sent by a plurality of users through social media, wherein the plurality of messages include messages sent by users other than an original user, and the messages quote the message sent by the original user, the system comprising:
a memory for storing the plurality of messages;
a processor device communicatively coupled to the memory; and
a user terminal communicatively coupled to the memory and the processor, wherein the user terminal is configured to perform the steps of a method comprising:
performing a primary evaluation of the potential for a message sent by a user other than the original user that quotes the message sent by the original user to be resent;
identifying original user who has sent the message for which the primary evaluation result was higher than a predetermined first threshold;
identifying a message group similar to a resent messages group, wherein the message group is based on the resent messages group that quotes the message sent by the original user;
performing a secondary evaluation for the potential that the similar message group to be resent; and
selecting the message group for which the secondary evaluation result was higher than a predetermined second threshold,
wherein performing the primary evaluation and the secondary evaluation is based on a decreasing function of the extent to which the user other than the original user has in the past, resent messages that quoted the message of the original user, wherein the influence of the user is based on an increasing function of a quantity of other users who follow the user other than the original user, wherein the extent of past resent messages is based on the number of times the user other than the original user has in a fixed period in the past, resent messages that quoted the message of the original user, wherein performing the primary evaluation and the secondary evaluation is based on a decreasing function of the similarity of the content of a message resent by the user and the content of a message resent further in the past by the user other than the original user.

10. The system according to claim 9, wherein the plurality of messages stored within the memory are messages that have been sampled from messages posted to social media.

* * * * *

UNITED STATES PATENT AND TRADEMARK OFFICE
CERTIFICATE OF CORRECTION

PATENT NO. : 9,705,837 B2  
APPLICATION NO. : 14/363323  
DATED : July 11, 2017  
INVENTOR(S) : Miki Enoki et al.

Page 1 of 1

It is certified that error appears in the above-identified patent and that said Letters Patent is hereby corrected as shown below:

On the Title Page

Item (72) Inventors, Line 4, please change:
"Raymond Harry Rudy"
To:
--Rudy Raymond Harry Putra--

Signed and Sealed this
Eleventh Day of August, 2020

Andrei Iancu
*Director of the United States Patent and Trademark Office*